US010119720B2

(12) United States Patent
Choi et al.

(10) Patent No.: US 10,119,720 B2
(45) Date of Patent: Nov. 6, 2018

(54) METHOD FOR CONTROLLING AIR CONDITIONER

(71) Applicants: Samsung Electronics Co., Ltd., Suwon-si, Gyeonggi-do (KR); University-Industry Cooperation Group of Kyung Hee University, Yongin-si, Gyeonggi-do (KR)

(72) Inventors: Dong-suk Choi, Suwon-si (KR); Geun Young Yun, Yongin-si (KR); Je-hyeon Lee, Suwon-si (KR); Jung-yoon Hahm, Seongnam-si (KR)

(73) Assignees: Samsung Electronics Co., Ltd., Suwon-si (KR); University-Industry Cooperation Group of Kyung Hee University, Yongin-si (KR)

( * ) Notice: Subject to any disclaimer, the term of this patent is extended or adjusted under 35 U.S.C. 154(b) by 73 days.

(21) Appl. No.: 15/434,620

(22) Filed: Feb. 16, 2017

(65) Prior Publication Data
US 2017/0241659 A1    Aug. 24, 2017

(30) Foreign Application Priority Data
Feb. 18, 2016    (KR) .................. 10-2016-0019294

(51) Int. Cl.
*F24F 11/62*    (2018.01)
*G05B 17/02*    (2006.01)
(Continued)

(52) U.S. Cl.
CPC ............. *F24F 11/62* (2018.01); *F24F 11/30* (2018.01); *G05B 17/02* (2013.01);
(Continued)

(58) Field of Classification Search
CPC .. F24F 11/46; F24F 11/47; F24F 11/62; F24F 11/63; F24F 11/64; F24F 11/65;
(Continued)

(56) References Cited

U.S. PATENT DOCUMENTS 5,197,666 A *    3/1993    Wedekind ................ F24F 11/00
                                                        236/46 R
7,392,661 B2 *    7/2008    Alles ..................... F24F 3/0442
                                                        236/94

(Continued)

FOREIGN PATENT DOCUMENTS

KR    10-1997-0066355 A    10/1997
KR    10-2001-0107257 A    12/2001
(Continued)

*Primary Examiner* — Crystal J Barnes-Bullock
(74) *Attorney, Agent, or Firm* — Jefferson IP Law, LLP

(57) ABSTRACT

A method for controlling an air conditioner is provided. The method includes calculating an index weight outdoor average temperature by calculating outdoor temperature data over a predetermined period, acquiring position information in which the air conditioner is installed, selecting an appropriate climatic model according to the position information, calculating a comfortable temperature of the day by substituting the index weight outdoor average temperature to the climatic model, setting the comfortable temperature as an indoor target temperature, and controlling a cooling or a heating of the air conditioner so that the indoor temperature reaches the indoor target temperature.

15 Claims, 6 Drawing Sheets

(51) Int. Cl.
*G05D 23/19* (2006.01)
*F24F 11/30* (2018.01)
*F24F 1/00* (2011.01)
*F24F 110/10* (2018.01)
*F24F 110/12* (2018.01)
*F24F 110/22* (2018.01)
*F24F 140/60* (2018.01)
*F24F 130/00* (2018.01)
*F24F 130/10* (2018.01)
*F24F 11/64* (2018.01)
*F24F 11/56* (2018.01)
*F24F 11/58* (2018.01)
*F24F 11/46* (2018.01)
*F24F 11/52* (2018.01)

(52) U.S. Cl.
CPC ........ *G05D 23/1917* (2013.01); *F24F 1/0003* (2013.01); *F24F 11/46* (2018.01); *F24F 11/52* (2018.01); *F24F 11/56* (2018.01); *F24F 11/58* (2018.01); *F24F 11/64* (2018.01); *F24F 2110/10* (2018.01); *F24F 2110/12* (2018.01); *F24F 2110/22* (2018.01); *F24F 2130/00* (2018.01); *F24F 2130/10* (2018.01); *F24F 2140/60* (2018.01)

(58) Field of Classification Search
CPC ............... F24F 2110/00; F24F 2110/10; F24F 2110/211; F24F 2110/12; F24F 2110/22; F24F 2110/50; F24F 2120/10; F24F 2130/10; F24F 2140/50; G05D 23/193; G05D 23/1931; G05B 2219/2614
See application file for complete search history.

(56) References Cited

U.S. PATENT DOCUMENTS

| | | | | |
|---|---|---|---|---|
| 8,121,734 | B2* | 2/2012 | Larsen | F24F 5/0089 |
| | | | | 700/276 |
| 8,660,813 | B2* | 2/2014 | Curtis | G05B 15/02 |
| | | | | 700/299 |
| 9,020,647 | B2* | 4/2015 | Johnson | F24F 11/001 |
| | | | | 700/277 |
| 9,429,923 | B2* | 8/2016 | Ward | G05B 15/02 |
| 9,501,805 | B2* | 11/2016 | McLean | G06Q 10/06 |
| 9,618,227 | B2* | 4/2017 | Drew | F24F 11/0086 |
| 9,869,484 | B2* | 1/2018 | Hester | G05B 17/02 |
| 2006/0255165 | A1 | 11/2006 | Ha | |
| 2010/0170272 | A1 | 7/2010 | Deangelis | |
| 2010/0235206 | A1* | 9/2010 | Miller | E04D 3/352 |
| | | | | 705/7.11 |
| 2014/0313105 | A1* | 10/2014 | Peso | G06G 3/001 |
| | | | | 345/4 |
| 2015/0323209 | A1 | 11/2015 | Khiani et al. | |
| 2016/0010888 | A1 | 1/2016 | Groskreutz et al. | |
| 2017/0051935 | A1* | 2/2017 | Lee | F24F 11/0012 |
| 2017/0123440 | A1* | 5/2017 | Mangsuli | F24F 11/62 |

FOREIGN PATENT DOCUMENTS

| | | |
|---|---|---|
| KR | 10-2006-0117761 A | 11/2006 |
| KR | 10-2015-0139362 A | 12/2015 |

* cited by examiner

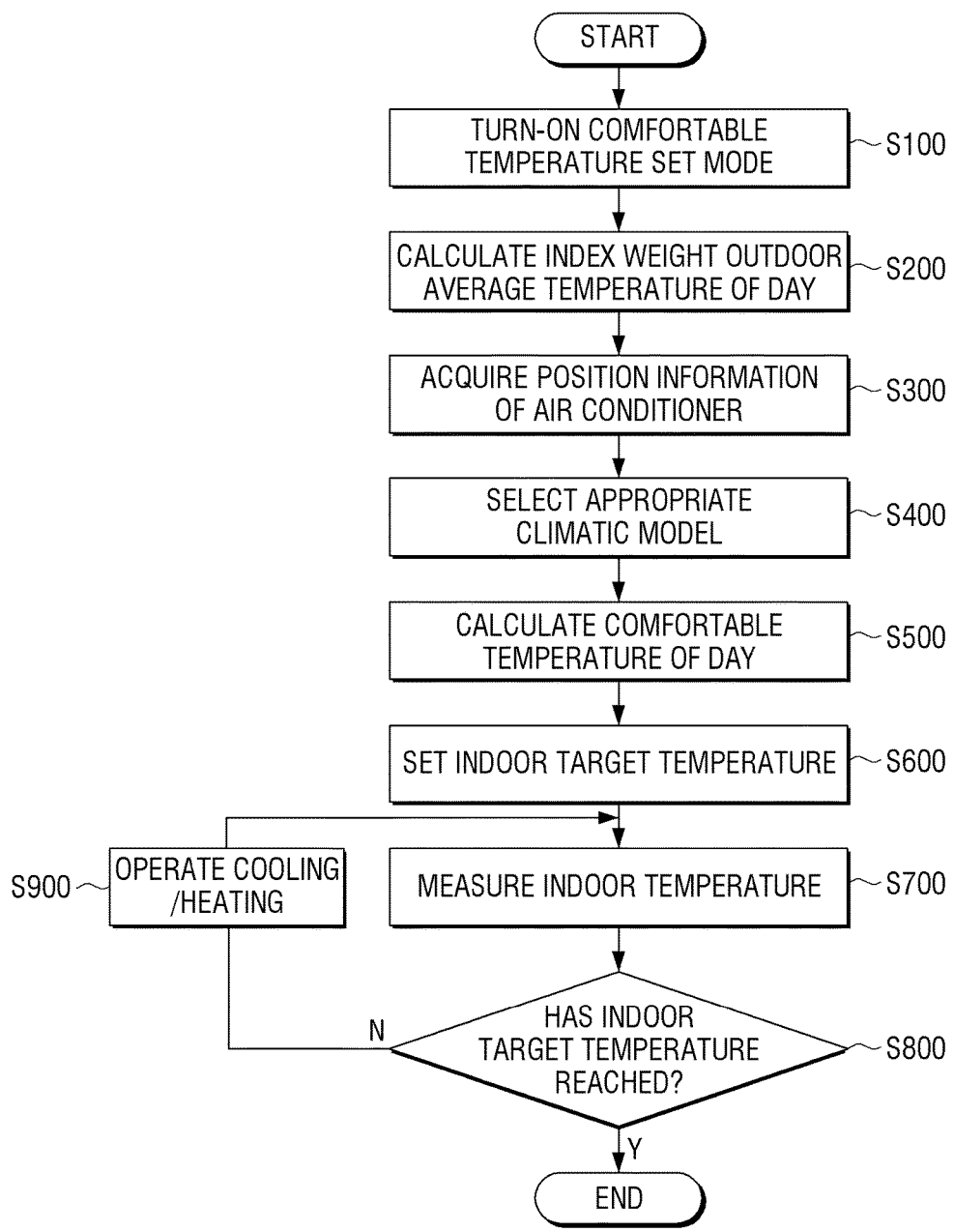

FIG. 5

| CLIMATIC MODEL | FIRST TEMPERATURE COEFFICIENT(A) | FIRST TEMPERATURE CONSTANT(B) |
|---|---|---|
| FIRST CLIMATIC MODEL (WEST COAST MARINE CLIMATE) | 0.2 ~ 0.4 | 16 ~ 18 |
| SECOND CLIMATIC MODEL (CONTINENTAL SUBARCTIC) | 0.2 ~ 0.4 | 18 ~ 22 |
| THIRD CLIMATIC MODEL (HUMID MID LATITUDE) | 0.1 ~ 0.3 | 18 ~ 22 |
| FOURTH CLIMATIC MODEL (SEMI ARID) | 0.3 ~ 0.5 | 13 ~ 17 |
| FIFTH CLIMATIC MODEL (TROPICAL SAVANNA) | 0.1 ~ 0.4 | 16 ~ 20 |
| SIXTH CLIMATIC MODEL (HUMID SUBTROPICAL) | 0.1 ~ 0.3 | 16 ~ 20 |
| SEVENTH CLIMATIC MODEL (MEDITERRANEAN) | 0.3 ~ 0.5 | 15 ~ 19 |
| EIGHTH CLIMATIC MODEL (HOT ARID) | 0.3 ~ 0.5 | 15 ~ 19 |

FIG. 6

| CLIMATIC MODEL | ENERGY CONSUMPTION WHEN THE PRESENT DISCLOSURE IS APPLIED (kWh/m$^2$) | ENERGY CONSUMPTION WHEN THE PRESENT DISCLOSURE IS NOT APPLIED (kWh/m$^2$) | ENERGY SAVING AMOUNT (kWh/m$^2$) | ENERGY SAVING RATIO (%) |
|---|---|---|---|---|
| FIRST CLIMATIC MODEL (WEST COAST MARINE CLIMATE) | 5.2 | 9.5 | 4.3 | 45.3 |
| SECOND CLIMATIC MODEL (CONTINENTAL SUBARCTIC) | 6.3 | 7.5 | 1.3 | 16.6 |
| THIRD CLIMATIC MODEL (HUMID MID LATITUDE) | 20.1 | 23.6 | 3.5 | 15 |
| FOURTH CLIMATIC MODEL (SEMI ARID) | 21 | 23.8 | 2.8 | 13.6 |
| FIFTH CLIMATIC MODEL (TROPICAL SAVANNA) | 24.9 | 29.1 | 4.2 | 14.3 |
| SIXTH CLIMATIC MODEL (HUMID SUBTROPICAL) | 19.7 | 22.8 | 3.1 | 13.6 |
| SEVENTH CLIMATIC MODEL (MEDITERRANEAN) | 8.62 | 9.92 | 1.3 | 13.1 |
| EIGHTH CLIMATIC MODEL (HOT ARID) | 13.7 | 16.2 | 2.5 | 15.3 |

METHOD FOR CONTROLLING AIR CONDITIONER

CROSS-REFERENCE TO RELATED APPLICATION(S)

This application claims the benefit under 35 U.S.C. § 119(a) of a Korean patent application filed on Feb. 18, 2016 in the Korean Intellectual Property Office and assigned Serial No. 10-2016-0019294, the entire disclosure of which is hereby incorporated by reference.

JOINT RESEARCH AGREEMENT

The present disclosure was made by or on behalf of the below listed parties to a joint research agreement. The joint research agreement was in effect on or before the date the present disclosure was made and the present disclosure was made as a result of activities undertaken within the scope of the joint research agreement. The parties to the joint research agreement are 1) Samsung Electronics Co., Ltd. and 2) University-Industry Cooperation Group of Kyung Hee University.

TECHNICAL FIELD

The present disclosure relates to a method for controlling an air conditioner. More particularly, the present disclosure relates to a method for controlling an air conditioner capable of easily setting a comfortable temperature of the air conditioner in various climatic conditions around the world.

BACKGROUND

In general, an air conditioner, which is an apparatus that keeps indoor air in a comfortable state, may adjust a temperature, a humidity, an airflow distribution, and the like of an indoor space.

Among others, the function of keeping an indoor temperature in an appropriate state is a main function of the air conditioner. The air conditioner may include an outdoor unit that performs a heat exchange between outdoor air and a refrigerant and an indoor unit that performs a heat exchange between indoor air and the refrigerant. Further, the air conditioner may discharge heat energy of the indoor air to the outside through the refrigerant, or discharge heat energy of the outdoor air to the indoor through the refrigerant.

The temperature adjustment of the indoor space using the air conditioner is performed by directly inputting a desired target temperature value to the indoor unit by a user and operating the air conditioner until an indoor temperature reaches the input temperature value to perform the heat exchange of the indoor air.

In operation of the air conditioner, the target temperature, which is a general reference of an existing indoor comfortable temperature, has a fixed value irrespective of a change of an outdoor temperature. However, the comfortable temperature actually felt by an occupant located in the indoor space is changed according to the change of the outdoor temperature. For example, when an average outdoor temperature of the previous day was 30° C., the indoor comfortable temperature of a next day that the user actually feels corresponds to 28° C. but an existing indoor environment reference is defined as 25° C. or less, and there was no change according to the condition of outside air.

As such, in the case in which the user directly sets the set temperature of the air conditioner using the indoor environment reference of the related art, since the actual comfortable temperature felt by the occupant is different from the set temperature of the air conditioner, there is a problem that satisfaction of the occupant and efficiency of the air conditioner are reduced.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for controlling an air conditioner that calculates and applies a comfortable temperature of an indoor space according to an outdoor temperature change of an area in which the air conditioner is installed.

In accordance with an aspect of the present disclosure, a method for controlling an air conditioner is provided. The method includes calculating an index weight outdoor average temperature by calculating outdoor temperature data over a predetermined period, acquiring position information in which the air conditioner is installed, selecting an appropriate climatic model according to the position information, calculating a comfortable temperature of the day by substituting the index weight outdoor average temperature to the climatic model, setting the comfortable temperature as an indoor target temperature, and controlling a cooling or a heating of the air conditioner so that the indoor temperature reaches the indoor target temperature.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWING

The above and other aspects, features, and advantages of certain embodiments of the present disclosure will be more apparent from the following description taken in conjunction with the accompanying drawings, in which:

FIG. 4 is a flowchart illustrating a process of controlling an air conditioner according to an embodiment of the present disclosure;

FIG. 5 is a table illustrating a first temperature coefficient and a first temperature constant that are set to correspond to each of first to eighth climatic models according to an embodiment of the present disclosure; and FIG. 6 is a table illustrating an energy consumption of each of the case in which a method for controlling an air conditioner according to an embodiment of the present disclosure is applied to each of the first to eighth climatic models in the summer, and the case in which not being applied, and an energy saving amount and an energy saving ratio accordingly.

Throughout the drawings, it should be noted that like reference numbers are used to depict the same or similar elements, features, and structures.

DETAILED DESCRIPTION

Figure 1:
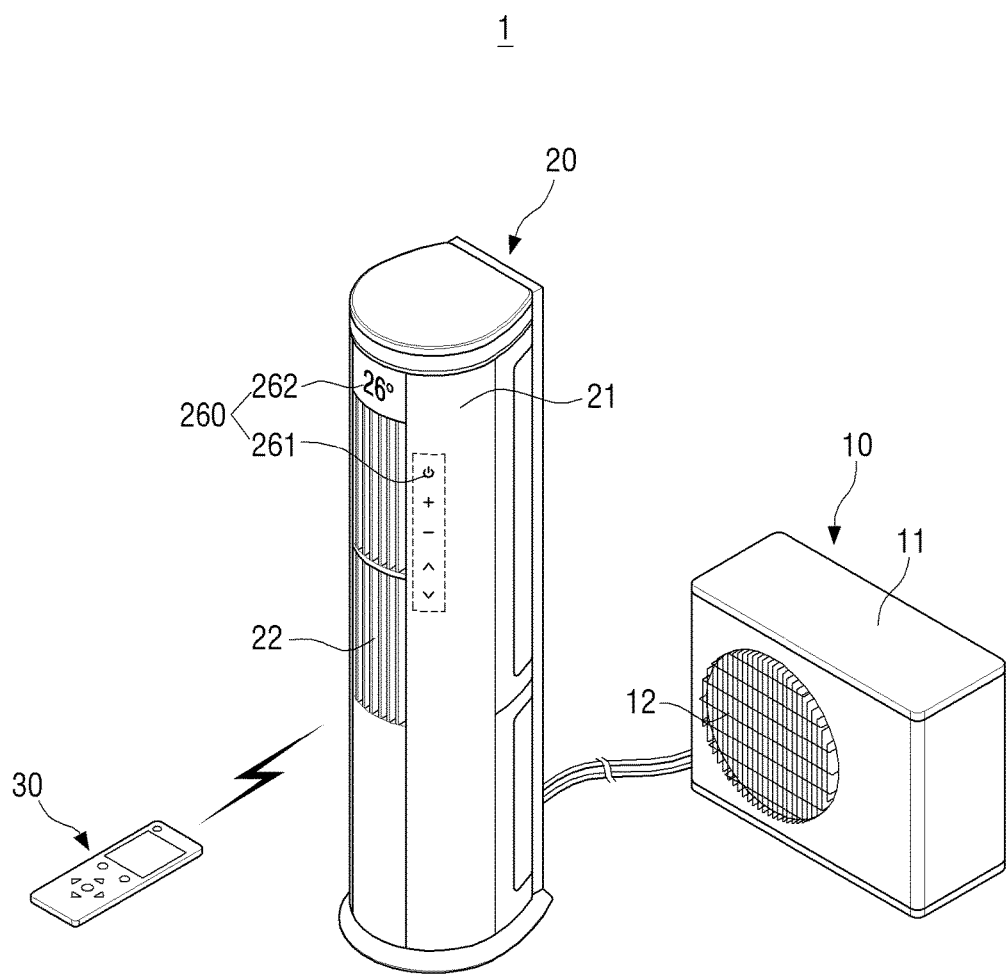
FIG. 1 is a view illustrating an appearance of an air conditioner according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Therefore, the present disclosure may be variously modified within a technical scope of the present disclosure through various embodiments described below, and the modified embodiments fall within the technical scope of the present disclosure. In addition, in order to help understand various embodiments described below, in regard to reference numerals indicated on the accompanying drawings, the related components of components that perform the same operation in the respective embodiments are indicated by the same or extension numeral.

FIG. 1 is a view illustrating an appearance of an air conditioner according to an embodiment of the present disclosure.

Referring to FIG. 1, the air conditioner 1 may include an outdoor unit 10 and an indoor unit 20, and may further include a remote controller 30.

The outdoor unit 10 and the indoor unit 20 may be connected to each other through at least one connection pipe, through which a refrigerant may move. Further, the outdoor unit 10 may be disposed in an outdoor space to perform a heat exchange between outdoor air and the refrigerant, and the indoor unit 20 may be disposed in an indoor space to perform a heat exchange between indoor air and the refrigerant. In addition, the remote controller 30 may receive an operation instruction for the outdoor unit 10 or the indoor unit 20 from a user to remotely transmit the operation instruction to the outdoor unit 10 or the indoor unit 20.

The outdoor unit 10 may include an outdoor unit body 11 configuring an appearance thereof and an outdoor unit outlet 12 provided on one side of the outdoor unit body 11 to discharge heat-exchanged air to the outside.

The indoor unit 20 may include an indoor unit body 21 configuring an appearance thereof and an indoor unit outlet 22 provided on a front surface of the indoor unit body 21 to discharge heat-exchanged air to the room. Further, the indoor unit 20 may further include an interface 260 for allowing a user to operate the air conditioner, and the interface 260 may include an input part 261 that receives an operation instruction of the air conditioner 1 from the user and a display 262 that displays operation information of the air conditioner 1.

Figure 2:
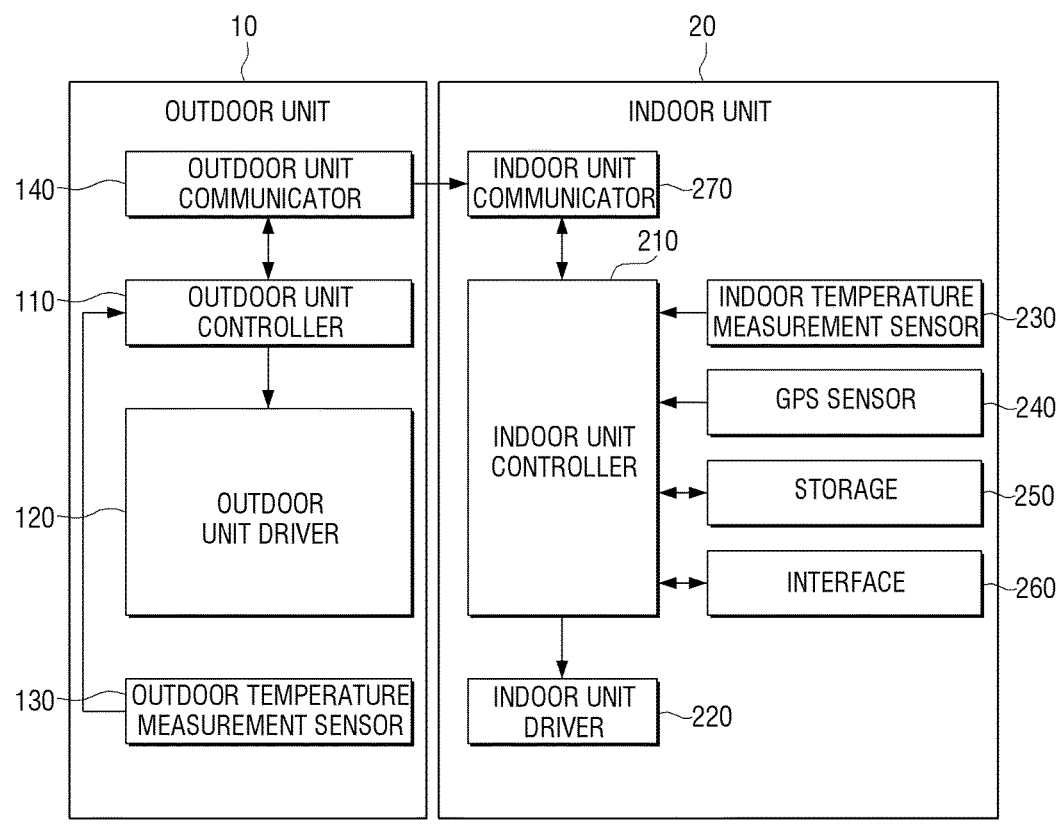
FIG. 2 is a view illustrating a configuration related to a heat exchange between an outdoor unit and an indoor unit illustrated in FIG. 1 according to an embodiment of the present disclosure.
Figure 3:
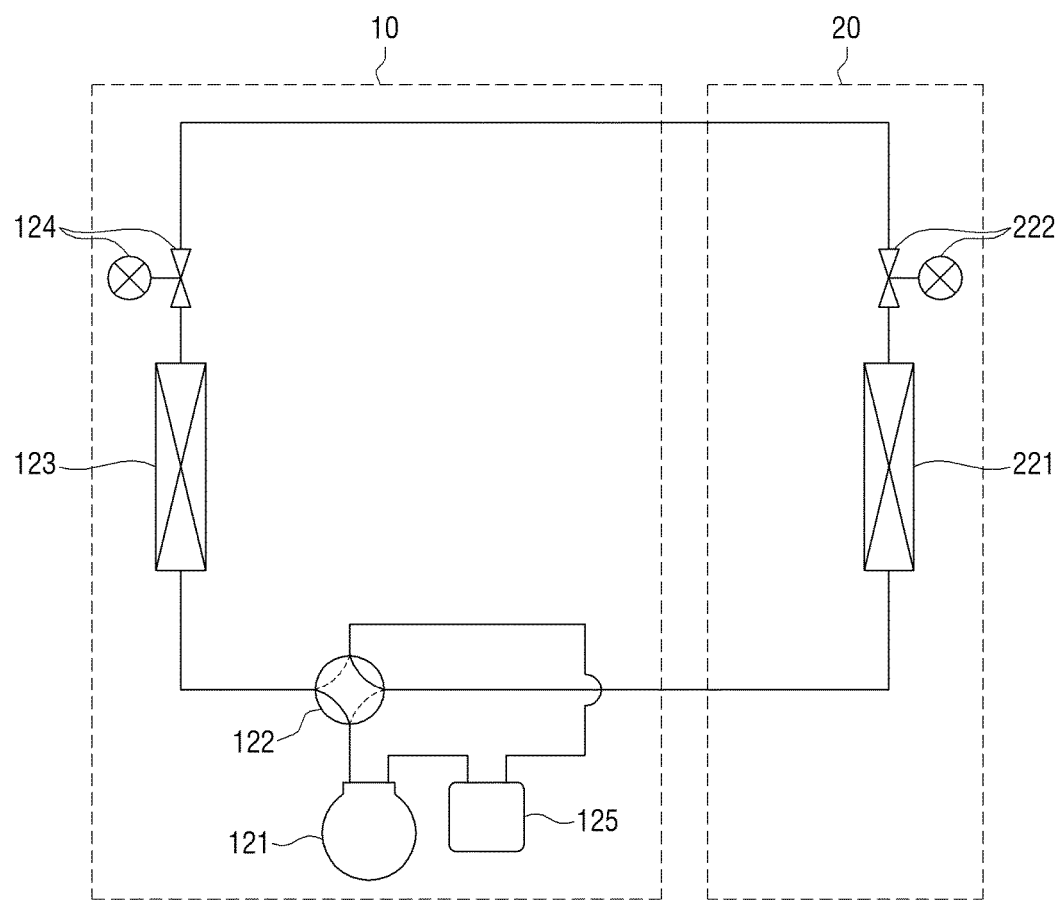
FIG. 3 is a view illustrating a refrigerant circulation process between the outdoor unit and the indoor unit illustrated in FIG. 2 according to an embodiment of the present disclosure.

FIG. 2 is a view illustrating a configuration related to a heat exchange between an outdoor unit and an indoor unit illustrated in FIG. 1, according to an embodiment of the present disclosure, and FIG. 3 is a view illustrating a refrigerant circulation process between the outdoor unit and the indoor unit illustrated in FIG. 2 according to an embodiment of the present disclosure.

Referring to FIGS. 2 and 3, a heat exchange between indoor and outdoor airs through the outdoor unit 10 and the indoor unit 20, and a structure for controlling the same will be described.

The outdoor unit 10 may include an outdoor unit controller 110, an outdoor unit driver 120, an outdoor temperature measurement sensor 130, and an outdoor unit communicator 140.

The outdoor unit controller 110 may control operations of the outdoor unit driver 120, the outdoor temperature measurement sensor 130, and the outdoor unit communicator 140.

In addition, the outdoor unit driver 120 may include a compressor 121, a four-way valve 122, an outdoor heat exchanger 123, an outdoor expansion valve 124, and an accumulator 125.

For example, the compressor 121 may compress the refrigerant, and the four-way valve 122 may selectively move the refrigerant compressed by the compressor 121 to any one of the outdoor heat exchanger 123 and the indoor unit 20. In addition, the outdoor heat exchanger 123 may perform a heat exchange between the refrigerant and the outdoor air, the outdoor expansion valve 124 may decompress the refrigerant which is moved to the outdoor heat exchanger 123 at the time of a heating operation of the air conditioner 1, and the accumulator 125 may prevent the refrigerant in a liquid state from being introduced into the compressor 121.

The outdoor temperature measurement sensor 130 may be disposed inside or outside the outdoor unit body 11 to sense the outdoor temperature of the outdoor space in which the outdoor unit 10 is located, and may transmit the sensed temperature to the outdoor unit controller 110 as an electrical signal. Further, the outdoor temperature measurement sensor 130 may include a thermistor of which electrical resistance is changed according to the temperature.

The outdoor unit communicator 140 may transmit and receive a signal wirelessly or wired to and from an indoor unit communicator 270 of the indoor unit 20 to be described below. As a result, the operation instruction of the air conditioner 1 set by the interface 260 of the indoor unit 20 may be received as a control signal, and outdoor temperature data measured by the outdoor temperature measurement sensor 130 may be transmitted to an indoor unit controller 210.

As described above, the outdoor unit communicator 140 may communicate wirelessly or wired with the indoor unit communicator 270, and may use, for example, a communication scheme such as RS-485, or the like.

In addition, the outdoor unit communicator 140 may also directly receive the control signal that is received through the remote controller 30.

The indoor unit 20 may include the indoor unit controller 210, an indoor unit driver 220, an indoor temperature measurement sensor 230, a global positioning system (GPS) sensor 240, a storage 250, the interface 260, and the indoor unit communicator 270.

The indoor unit controller 210 may control operations of the indoor unit driver 220, the indoor temperature measurement sensor 230, the GPS sensor 240, the storage 250, the interface 260, and the indoor unit communicator 270. Further, the indoor unit controller 210 may directly control the outdoor unit 20 through the operation instruction of the user received through the interface 260 by transmitting the control signal to the outdoor communicator 140 through the indoor unit communicator 270.

Further, the indoor unit controller 210 may be directly connected to the outdoor driver 120 and the outdoor temperature measurement sensor 130 of the outdoor unit 10 to thereby directly control the outdoor unit 10 through the indoor unit controller 210. In this case, the outdoor unit controller 110 and the outdoor unit communicator 140 of the outdoor unit 10 may be omitted, which results in simplifying the structure of the air conditioner 1.

The indoor unit driver 220 may include an indoor heat exchanger 221 capable of performing a heat exchange between the indoor air and the refrigerant and an indoor expansion valve 222 that decompresses the refrigerant provided to the indoor heat exchanger 221 at the time of a cooling operation of the air conditioner 1.

The indoor temperature measurement sensor 230 may be disposed inside or outside the indoor unit body 21. Further, the indoor temperature measurement sensor 230 may sense the indoor temperature of the indoor space in which the indoor unit 20 is located, and may transmit the sensed temperature to the indoor unit controller 210 as an electrical signal. The indoor temperature measurement sensor 230 may include a thermistor of which electrical resistance is changed according to the temperature.

The GPS sensor 240 may receive radio waves from a plurality of GPS satellites (not shown) on the earth orbit, may detect a position at which the indoor unit 20 is installed using the time of arrival of the radio waves from the GPS satellites to the indoor unit 20, and may automatically transmit the detected position information of the indoor unit 20 to the indoor unit controller 210 every a predetermined period. Thus, it is possible to select an appropriate climatic model according to a geographical position in an adaptive comfortable model to be described below.

Further, the GPS sensor 240 may also be included in the outdoor unit 10.

The storage 250 may include a non-volatile memory such as a magnetic disk, a semiconductor disk, or the like for permanently storing a program and data related to the operation of the air conditioner 1, as well as a volatile memory such as dynamic-random-access memory (D-RAM), static-RAM (S-RAM), or the like for temporarily storing temporary data that may be generated during the operation of the air conditioner 1.

The interface 260 may be disposed on an outer surface of the indoor unit body 21 to interface between the user and the air conditioner 1, and may include an input part 261 and a display 262.

The input part 261 may include a button-type switch, a membrane switch, or a touch panel for receiving a variety of operation instructions of the air conditioner 1.

For example, the user may control the operations such as a cooling/heating mode, a set temperature, a wind direction, and a wind speed of the air conditioner 1, and may turn on or off a comfortable temperature set mode according to the application of the adaptive comfortable model, or may directly input an accurate geographical position of the indoor unit 20, through the input part 261.

Further, the display 262 may transfer the operation information of the air conditioner 1 to the user through a visualized character or image, and may include a display panel or a light emitting diode panel. In addition, the input part 261 and the display 262 may be integrally configured, and may include, for example, a touch screen.

However, the remote controller 30 may be separately provided with an input part capable of receiving a variety of operation instructions of the air conditioner 1 and a display capable of displaying the operation information of the air conditioner 1. In such an embodiment, the interface 260 of the indoor unit 20 may include only a power button capable of turning on/off the power of the air conditioner 1 and a power indication light-emitting diode (LED) or an operation indication LED indicating whether or not the power is supplied or whether or not the operation is performed.

The indoor unit communicator 270 may transmit and receive the signal wirelessly or wired to and from the outdoor unit communicator 140. For example, the indoor unit communicator 270 may transmit the control signal of the outdoor unit 20 transferred from the indoor unit controller 210 to the outdoor unit communicator 140, or may receive the operation information of the outdoor unit 20 and the outdoor temperature data measured by the outdoor temperature measurement sensor 130 from the outdoor unit communicator 140.

Further, the indoor unit communicator 270 may be connected to a smartphone or a PC of the user through a wireless communication scheme such as near field communication (NFC) or Wi-Fi to thereby also receive the operation instruction. Further, the indoor unit communicator 270 itself may be connected to the Internet communication network to directly receive climate information such as a temperature of the outdoor in which the air conditioner 1 is installed and a weather forecast, or to directly receive or transmit a program and data related to the operation of the air conditioner 1 such as an upgrade of firmware through the Internet.

Hereinafter, a refrigerant circulation process in a cooling mode and a heating mode of the air conditioner 1 will be described with reference to FIGS. 2 and 3.

In the case in which the air conditioner 1 is operated in the cooling mode, the refrigerant is compressed to high pressure by the compressor 121 of the outdoor driver 120, and the compressed refrigerant is guided to the outdoor heat exchanger 123 by the four-way valve 122. The compressed refrigerant is condensed by the outdoor heat exchanger 123, and the refrigerant discharges latent heat to the outdoor air while being condensed. The condensed refrigerant may be guided to the indoor unit 20.

The refrigerant guided to the indoor unit 20 is decompressed by the indoor expansion valve 222 of the indoor unit driver 220 and is then evaporated by the indoor heat exchanger 221. The refrigerant absorbs the latent heat from the indoor air while being evaporated. As such, in the case of the cooling mode, the air conditioner 1 may cool the indoor air using the heat exchange between the refrigerant and the indoor air, which is performed by the indoor heat exchanger 221.

Thereafter, the evaporated refrigerant is guided to the outdoor unit 10, and is separated into a liquefied refrigerant that has not yet evaporated and an evaporated gaseous refrigerant by the accumulator 125 of the outdoor unit 10. Then, the gaseous refrigerant is moved to the compressor 121. The refrigerant guided to the compressor 121 is compressed and is again moved to the four-way valve 122, thereby making it possible to repeat the above-mentioned refrigerant circulation.

In summary, in the cooling mode of the air conditioner 1, the indoor unit 20 absorbs heat energy of the indoor air and the outdoor unit 10 discharges the heat energy to the outside, thereby making it possible to move indoor heat energy to the outside.

In the case in which the air conditioner 1 is operated in the heating mode, the refrigerant is compressed to high pressure by the compressor 121 of the outdoor unit 10, and the compressed refrigerant is guided to the indoor unit 20. The refrigerant is condensed by the indoor heat exchanger 221 included in the indoor unit 20. The refrigerant discharges the latent heat to the indoor air while being condensed. As such, in the case of the heating mode, the air conditioner 1 may heat the indoor air using the heat exchange between the refrigerant and the indoor air, which is performed by the indoor heat exchanger 221. The condensed refrigerant is decompressed by the indoor expansion valve 222 and is then guided to the outdoor unit 10.

The refrigerant guided to the outdoor unit 10 is decompressed by the outdoor expansion valve 124 and is then evaporated by the outdoor heat exchanger 123. The evaporated refrigerant is separated into a liquefied refrigerant that has not yet evaporated and an evaporated gaseous refrigerant by the accumulator 125 of the outdoor unit 10, and the gaseous refrigerant is then moved to the compressor 121. The refrigerant moved to the compressor 121 is compressed and is again moved to the four-way valve 122, thereby making it possible to repeat the above-mentioned refrigerant circulation.

In summary, in the heating mode of the air conditioner 1, the outdoor unit 10 absorbs heat energy of the outdoor air and the indoor unit 20 discharges the heat energy to the indoor space, thereby making it possible to transfer the outdoor heat energy to the room.

FIG. 4 is a flowchart illustrating a process of controlling an air conditioner according to an application of an adaptive comfortable model according to an embodiment of the present disclosure.

Referring to FIG. 4, an adaptive comfortable model, which is a series of methods for calculating a comfortable temperature of the air conditioner 1 and setting the same to an indoor target temperature, may be described with reference to the process of controlling an air conditioner to be described.

Hereinafter, the process of controlling an air conditioner according to an application of the adaptive comfortable model of the air conditioner 1 will be described with reference to FIGS. 2 to 4.

Referring to FIG. 4, a method for controlling the air conditioner 1 according to an embodiment of the present disclosure may include an operation S100 of turning-on a comfortable temperature set mode, an operation S200 of calculating an index weight outdoor average temperature of the day, an operation S300 of acquiring position information of the air conditioner, an operation S400 of selecting an appropriate climatic model, an operation S500 of calculating a comfortable temperature of the day, an operation S600 of setting an indoor target temperature, an operation S700 of measuring an indoor temperature, an operation S800 of determining whether or not the indoor temperature reaches the indoor target temperature, and an operation S900 of controlling a cooling or heating operation of the air conditioner 1.

Although the respective operations of a method for controlling the air conditioner 1 described above will be described as being performed in the described order as an example for convenience of explanation, the order of the respective operations may be interchanged, and specific operations may be overlapped or omitted.

Similar to a general air conditioner, the air conditioner 1 according to an embodiment of the present disclosure may directly input the desired target temperature value by the user through the input part 261, and may be operated as the heating or cooling mode until the indoor temperature reaches the temperature value input by the user.

Further, the air conditioner 1 according to an embodiment of the present disclosure may turn-on the comfortable temperature set mode of the air conditioner 1 through the input part 261, instead of directly inputting the target temperature value by the user at operation S100.

For example, the user may press a comfortable temperature set mode button of the input part 261 to thereby turn-on or off the comfortable temperature set mode, and the comfortable temperature set mode may also be turned-on or off by the remote controller 30.

If the comfortable temperature set mode is turned-on, an index weight outdoor average temperature of the day may be calculated at operation S200.

The index weight outdoor average temperature is a value obtained by applying and averaging each index weight to outdoor temperature data which is accumulated and collected over a predetermined period, and is hereinafter referred to as the index weight outdoor average temperature.

Before describing an operation of calculating the index weight outdoor average temperature of the day, the outdoor temperature measurement sensor 130 may collect the outdoor temperature data over the predetermined period, in preparation for the operation of the air conditioner as the comfortable temperature set mode regardless of whether the comfortable temperature set mode is turned-on/off.

Further, the outdoor temperature data of the area in which the air conditioner 1 is installed may also be received from the weather station through the indoor unit communicator 270 which may be connected to the Internet, and in this case, the outdoor temperature measurement sensor 130 may be omitted from the outdoor unit 10.

The predetermined period may include a period which is set in a unit of days, and may include a period which is set in a pre-programmed unit in the indoor unit controller 210 and the storage 250. In addition, the predetermined period may be a unit of hour/minute/second rather than the unit of days, and the outdoor temperature measurement sensor 130 may collect the outdoor temperature data in real time and may accumulate and store the outdoor temperature data in the storage 250.

Hereinafter, the predetermined period is set to the unit of days for convenience of explanation, and the case in which the period is set to one week will be described as an example.

The index weight outdoor average temperature of the day may be calculated through the outdoor temperature data which is accumulated and collected over the predetermined period at operation S200.

The calculating of the index weight outdoor average temperature may include calculating the index weight outdoor average temperature by applying a weight index to an outdoor average temperature of the previous day and an index weight outdoor average temperature of the previous day. Here, when the index weights are applied, a larger index weight may be applied to the index weight outdoor average temperature of the previous day.

The index weight outdoor average temperature of the previous day may be calculated by applying the index weight to the outdoor temperatures sensed over one week. Here, when the index weights are applied, as the outdoor temperature is older, the smaller index weight may be applied.

For example, a process of calculating the index weight outdoor average temperature may be expressed the following Equations 1 and 2.

$$T_{rm(n-1)} = \frac{T_{e(n-2)} + 0.8T_{e(n-3)} + 0.6T_{e(n-4)} + 0.5T_{e(n-5)} + 0.4T_{e(n-6)} + 0.3T_{e(n-7)} + 0.2T_{e(n-8)}}{3.8} \quad \text{Equation 1}$$

$$T_{rm(n)} = (1 - a_{rm})T_{e(n-1)} + a_{rm}T_{rm(n-1)} \quad \text{Equation 2}$$

Equation 1 indicates a process of calculating the index weight outdoor average temperature of the previous day, and Equation 2 indicates a process of calculating the index weight outdoor average temperature of the day.

In Equation 1, $T_{rm(n-1)}$ indicates the index weight outdoor average temperature of the previous day, $T_{e(n-2)}$ indicates an outdoor average temperature of two days ago, $T_{e(n-3)}$ indicates an outdoor average temperature of three days ago, $T_{e(n-4)}$ indicates an outdoor average temperature of four days ago, $T_{e(n-5)}$ indicates an outdoor average temperature of five days ago, $T_{e(n-6)}$ indicates an outdoor average temperature of six days ago, $T_{e(n-7)}$ indicates an outdoor average temperature of seven days ago, and $T_{e(n-8)}$ indicates an outdoor average temperature of eight days ago.

In Equation 1, 0.8, 0.6, 0.5, 0.4, 0.3, and 0.2 multiplied with the outdoor average temperature are examples of the index weights for the respective outdoor average temperatures, and referring to Equation 1, it may be confirmed that as the outdoor average temperature is older, the lower index weight is applied. This is because the older outdoor average temperature has the lower impact on predicting a current outdoor average temperature.

In Equation 2, $T_{rm(n)}$ indicates the index weight outdoor average temperature of the day, $T_{e(n-1)}$ indicates an outdoor average temperature of the previous day, $T_{rm(n-1)}$ indicates an index weight outdoor average temperature of the previous day, and $1-a_{rm}$ and $a_{rm}$ indicate the index weights of the outdoor average temperature of the previous day and the index weight outdoor average temperature of the previous day, respectively. It is preferable for $a_{rm}$ to have a value greater than $1-a_{rm}$ that the index weight outdoor average temperature of the previous day sufficiently reflects an outdoor air average temperature over the one week as a temperature obtained by weight-averaging outdoor air average temperatures over the previous week based on the previous day. In addition, hereinafter, for convenience of explanation, $1-a_{rm}$ may be referred to as a first weight index and $a_{rm}$ may be referred to as a second weight index.

Referring to Equation 1 and Equation 2, the index weight outdoor average temperature of the previous day $T_{rm(n-1)}$ may be calculated by substituting the outdoor average temperatures from two days ago to eight days ago based on the previous day to Equation 1. If the index weight outdoor average temperature of the previous day $T_{rm(n-1)}$ is calculated from Mathematical 1, the index weight outdoor average temperature of the day $T_{rm(n)}$ may be calculated by substituting the index weight outdoor average temperature of the previous day $T_{rm(n-1)}$ and the outdoor average temperature of the previous day $T_{e(n-1)}$ to Equation 2.

Although the embodiment of the present disclosure describes the case in which the index weight outdoor average temperature is calculated by applying the index weight as an example, a method of reflecting the accumulated outdoor temperature data in calculating the comfortable temperature may be diversely changed.

Next, the position information in which the air conditioner 1 is installed may be acquired at operation S300.

The position information of the air conditioner 1 may be automatically acquired through the GPS sensor 240 of the indoor unit 20 as described above. Further, the user may directly input the position information of the air conditioner 1 through the input part 261. For example, the user may input accurate position information of the air conditioner 1 by inputting an address at which the air conditioner 1 is installed through the input part 261, or selecting a position at which the air conditioner 1 is installed through a map displayed on the display 262 or another screen.

Thereafter, an appropriate climatic model among a plurality of climatic models may be selected based on geographic position information of the air conditioner 1 at operation S400.

First, in a method for controlling an air conditioner 1 according to an embodiment of the present disclosure, an indoor comfortable temperature may be calculated by the following Equation 3.

$$T_{com(n)} = AT_{rm(n)} + B \quad \text{Equation 3}$$

For example, in Equation 3, $T_{com(n)}$ indicates the indoor comfortable temperature intended to be calculated, $T_{rm(n)}$ indicates the index weight outdoor average temperature of the day, A indicates a first temperature coefficient used for calculating the comfortable temperature through the index weight outdoor average temperature, and B indicates a first temperature constant used for calculating the comfortable temperature through the index weight outdoor average temperature.

Further, in Equation 3, the comfortable temperature may be calculated by multiplying the first temperature coefficient by the index weight outdoor average temperature of the day and adding the first temperature constant, and the comfortable temperature may be calculated by Equations or methods other than the above Equation 3.

In order to select the appropriate climatic model, the first temperature coefficient A and the first temperature constant B according to the respective climatic models may be predetermined by classifying the respective geographic positions of the world in which the air conditioner 1 may be installed into a plurality of climatic models, and the first temperature coefficient A and the first temperature constant B for calculating the comfortable temperature may be selected by matching the corresponding climatic model to the actually acquired position information of the air conditioner 1.

For example, the world may be distinguished by a total of five climatic models such as a tropical climate, an arid climate, a temperate climate, a cold climate, and a polar climate, depending on the geographic positions, and the first temperature coefficient A and the first temperature constant B of Equation 3 for calculating the comfortable temperature according to the position of the air conditioner 1 may be selected by setting the first temperature coefficient A and the first temperature constant B corresponding to the corresponding climatic zones, respectively, and matching the actual position information of the air conditioner 1 detected by the GPS sensor 240 to the corresponding climatic zone.

As an example, in a method for controlling an air conditioner 1, the plurality of climatic models may include first to eighth climatic models, wherein the first climatic model may be a west coast marine climate, the second climatic model may be a continental subarctic climate, the third climatic model may be a humid mid latitude climate, the fourth climatic model may be a semi arid climate, the fifth climatic model may be a tropical savanna climate, the sixth climatic model may be a humid subtropical climate, the seventh climatic model may be a Mediterranean climate, and the eighth climatic model may be a hot arid climate.

The first to eighth climatic models may be distributed throughout the world. For example, the hot arid climate, which is the eighth climatic model, may be distributed as a plural in the northern and southern regions of the African continent, the southern region of South America, the central region of the Australian continent, and the central region of the China.

Further, the Koppen-Geiger climate classification which is widely used as the world climate classification method, may be applied to the first to eighth climatic models, and eight or more climatic models corresponding to sub-climate classifications included in the Koppen-Geiger climate classification may be selected, and the first temperature coefficient A and the first temperature constant B according to each climatic model may be set.

FIG. 5 is a table illustrating a first temperature coefficient and the first temperature constant that are set to correspond to each of first to eighth climatic models according to an embodiment of the present disclosure.

Referring to FIG. 5, the first temperature coefficient A and the first temperature constant B of each climatic model may be set by deriving a correlation between the index weight outdoor average temperature and the comfortable temperature according to each climatic model by a statistical regression analysis method, and the setting of the first temperature coefficient A and the first temperature constant B according to each climatic model may be changed according to the analysis method of the correlation between the index weight outdoor average temperature and the comfortable temperature.

As described above, each of the first to eighth climatic models may correspond to each of the geographic positions in the world in which the air conditioner 1 may be installed. For example, in the case in which the installation position of the air conditioner 1 detected by the GPS sensor 240 is Korea, since Korea corresponds to the humid mid latitude climate, which is the third climatic model, the first temperature coefficient A may be set to 0.1 to 0.3, and the first temperature constant B may be set to 18 to 22, as illustrated in FIG. 5.

In addition, although an embodiment of the present disclosure describes a case in which the climate zones of the world is distinguished into the first to eighth climatic models as an example in setting the first temperature coefficient A and the first temperature constant B according to the climatic model of each geographic position and the corresponding climatic model, the comfortable temperature according to each geographic position may be calculated in more detail by setting separate sub-climatic models for each continent or each country rather than the world.

If the appropriate climatic model is selected, the comfortable temperature of the day may be calculated at operation S500.

As described above, the first temperature coefficient A and the first temperature constant B of Equation 3 may be selected by selecting the appropriate climatic model, and the comfortable temperature of the day may be calculated by substituting the index weight outdoor average temperature of the day calculated by the above Equations 1 and 2 to Equation 3.

Further, since the first temperature coefficient A and the first temperature constant B are limited as a range in FIG. 5, it is also possible to calculate the comfortable temperature as the range by a combination the maximum value and the minimum value of the first temperature coefficient A and the first temperature constant B.

For example, in the case in which the installation position of the air conditioner 1 is Korea, referring to FIG. 5, since the first temperature coefficient A may be set to 0.1 to 0.3 and the first temperature constant B may be set to 18 to 22, the range of the comfortable temperature of the day may be calculated by the following Equation 4 by substituting the respective maximum value and minimum value of the first temperature coefficient A and the first temperature constant B to Equation 3.

$$0.1T_{rm(n)}+18 \leq T_{com(n)} \leq 0.3T_{rm(n)}+22 \qquad \text{Equation 4}$$

Further, the range of the comfortable temperature of the day may also be set by the following Equations 5 and 6.

$$T_{com(n).max}=T_{com(n)}+C \qquad \text{Equation 5}$$

$$T_{com(n).min}=T_{com(n)}-C \qquad \text{Equation 6}$$

In Equation 5, $T_{com(n),max}$ indicates an upper limit value of the comfortable temperature, $T_{com(n)}$ indicates the comfortable temperature, and C indicates a second temperature constant for calculating the range of the comfortable temperature. Further, in Equation 6, $T_{com(n),min}$ indicates a lower limit value of the comfortable temperature, $T_{com(n)}$ indicates the comfortable temperature, and C indicates the second temperature constant. The second temperature constant C may also be determined to correspond to the climatic model corresponding to the installation position of the air conditioner 1, similar to the first temperature coefficient A and the first temperature constant B.

According to another embodiment of the present disclosure, the indoor comfortable temperature may be calculated by the following Equations 7 to 9.

$$T'_{com(n)}=A'T_{rm(n)}+B'+C'RH_{current} \qquad \text{Equation 7}$$

$$T'_{com(n).max}=T'_{com(n)}+D' \qquad \text{Equation 8}$$

$$T'_{com(n).min}=T'_{com(n)}-D' \qquad \text{Equation 9}$$

Equation 7 indicates a process of setting an indoor comfortable temperature in consideration of outdoor humidity together with the outdoor temperature according to another embodiment of the present disclosure, and Equation 8 and Equation 9 indicate a process of setting a range of the indoor comfortable temperature in consideration of humidity according to another embodiment of the present disclosure. For example, Equation 8 indicates a process of setting an upper limit value of the comfortable temperature, and Equation 9 indicates a process of setting a lower limit value of the comfortable temperature.

In Equation 7, $T'_{com(n)}$ indicates an indoor comfortable temperature in consideration of humidity, $T_{rm(n)}$ indicates the index weight outdoor average temperature of the day, $RH_{current}$ indicates outdoor relative humidity, A' indicates a second temperature coefficient, B' indicates a third temperature constant, and C' indicates a humidity coefficient. The second temperature coefficient A', the third temperature constant B', and the humidity coefficient C' may be each determined according to the climatic model according to the position of the air conditioner 1.

In Equation 8, $T'_{com(n),max}$ indicates an upper limit value of the indoor comfortable temperature in consideration of humidity, $T'_{com(n)}$ indicates the comfortable temperature in consideration of humidity, and D' indicates a fourth temperature constant. In Equation 9, $T'_{com(n),min}$ indicates a lower limit value of the indoor comfortable temperature in consideration of humidity, $T_{com(n)}$ indicates the indoor comfortable temperature in consideration of humidity, and D' indicates the fourth temperature constant. Further, the fourth temperature constant D' may also be determined according to the climatic model according to the position of the air conditioner 1.

If the comfortable temperature of the day is calculated, the calculated comfortable temperature may be set as an indoor target temperature at operation S600, and an indoor temperature of an indoor space in which the indoor unit 20 is disposed may be measured at operation S700.

For example, the indoor unit controller 210 may prepare the cooling or heating operation of the air conditioner 1 by setting the calculated comfortable temperature of the day as the indoor target temperature. Further, if the indoor target temperature is set, the indoor temperature is measured by the indoor temperature measurement sensor 230 at operation S700.

Next, the indoor unit controller 210 may control the cooling or heating operation of the air conditioner 1 by comparing the indoor target temperature with the indoor temperature measured by the indoor temperature measurement sensor 230 at operation S900.

For example, if it is determined that the indoor temperature is matched to the indoor target temperature, the control of the air conditioner 1 may be terminated without the cooling or heating operation of the air conditioner 1.

Further, if it is determined that the indoor temperature is higher than the indoor target temperature, the cooling mode may be operated, and if it is determined that the indoor temperature is lower than the indoor target temperature, the heating mode may be operated.

In addition, a process of determining whether or not the indoor temperature reaches the indoor target temperature may include a process of determining whether or not the indoor temperature reaches an indoor target temperature range.

As described above, since the comfortable temperature may also be calculated as the range value, the indoor target temperature may also be set as a range.

Therefore, if it is determined that the indoor temperature reaches the indoor target temperature range, the operation of the air conditioner 1 may be terminated, and if it is determined that the indoor temperature does not reach the indoor target temperature range, the cooling mode or the heating mode of the air conditioner 1 may be operated.

After the cooling or heating operation is performed, if it is determined that the indoor temperature measured by the indoor temperature measurement sensor 230 reaches the indoor target temperature, the operation and the control of the air conditioner 1 may be terminated.

By a method for controlling an air conditioner 1 according to an embodiment of the present disclosure described above, the comfortable temperature which may be differently calculated for each of the geographical positions of the world may be calculated and may be automatically set as the indoor target temperature of the air conditioner 1, thereby making it possible to efficiently control the cooling or heating operation of the air conditioner 1.

Thereby, the indoor target temperature which is closest to the comfortable temperature which may be actually felt by an occupant may be automatically set, and the unnecessary consumption of energy that may be caused by operating the air conditioner 1 more than needs may be prevented.

FIG. 6 is a table illustrating an energy consumption of each of the case in which a method for controlling an air conditioner 1 according to an embodiment of the present disclosure is applied to each of the first to eighth climatic models in the summer, and the case in which not being applied, and an energy saving amount and an energy saving ratio accordingly.

Referring to FIG. 6, it may be confirmed that energy efficiency of the air conditioner 1 may be increased while maintaining the comfort felt by the occupant, by a method for controlling an air conditioner 1 according to an embodiment of the present disclosure.

In addition, a method for controlling an air conditioner 1 according to the present disclosure may calculate the comfortable temperature in a day unit or in real time in which the air conditioner 1 is operated, and may apply the calculated comfortable temperature as the indoor target temperature. Accordingly, the indoor target temperature of the air conditioner 1 may be changed flexibly in response to a change of the outdoor temperature.

Further, by detecting the geographical position information in which the air conditioner 1 is installed through the GPS sensor 240, matching the detecting geographical position information to a plurality of predetermined climatic models to select the appropriate climatic model, and calculating the comfortable temperature accordingly, a single model of the air conditioner 1 to which a method for controlling an air conditioner according to an embodiment of the present disclosure is applied may be commonly used over the world.

Hereinabove, while various embodiments of the present disclosure have been separately described, the respective embodiments are not necessarily solely implemented, and the configuration and the operation of the respective embodiments may also be implemented in combination with other embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for controlling an air conditioner, the method comprising:
    calculating an index weight outdoor average temperature by calculating outdoor temperature data over a predetermined period;
    acquiring position information in which the air conditioner is installed;
    selecting an appropriate climatic model according to the position information;
    calculating a comfortable temperature of the day by substituting the index weight outdoor average temperature to the climatic model;
    setting the comfortable temperature as an indoor target temperature; and
    controlling a cooling or a heating of the air conditioner so that the indoor temperature reaches the indoor target temperature.

2. The method as claimed in claim 1, wherein the selecting of the climatic model comprises selecting the climatic model corresponding to the position information among a plurality of climatic models which are predetermined for geographical positions of the world.

3. The method as claimed in claim 2, wherein the calculating of the comfortable temperature comprises:
adding a predetermined temperature constant to a value obtained by multiplying a predetermined temperature coefficient by the index weight outdoor average temperature; and
setting the temperature coefficient and the temperature constant to correspond to each of the plurality of climatic models.

4. The method as claimed in claim 3, wherein the plurality of climatic models include first to eighth climatic models, and
the first climatic model is a west coast marine climate, the second climatic model is a continental subarctic climate, the third climatic model is a humid mid latitude climate, the fourth climatic model is a semi arid climate, the fifth climatic model is a tropical savanna climate, the sixth climatic model is a humid subtropical climate, the seventh climatic model is a Mediterranean climate, and the eighth climatic model is a hot arid climate.

5. The method as claimed in claim 4, wherein the first to eighth climatic models each include first to eighth temperature coefficients and first to eighth temperature constants.

6. The method as claimed in claim 5, wherein the first and second temperature coefficients are each in a range of 0.2 to 0.4,
the first temperature constant is in a range of 16 to 18, and
the second temperature constant is in a range of 18 to 22.

7. The method as claimed in claim 5, wherein the third and sixth temperature coefficients are each in a range of 0.1 to 0.3,
the third temperature constant is in a range of 18 to 22, and
the sixth temperature constant is in a range of 16 to 20.

8. The method as claimed in claim 5, wherein the fourth, seventh, and eighth temperature coefficients are each in a range of 0.3 to 0.5,
the fourth temperature constant is in a range of 13 to 17, and
the seventh and eighth temperature constants are each in a range of 15 to 19.

9. The method as claimed in claim 5, wherein the fifth temperature coefficient is in a range of 0.1 to 0.4, and
the fifth temperature constant is in a range of 16 to 20.

10. The method as claimed in claim 5, wherein the first to eighth climatic models each correspond to the geographical positions of the world according to a Koppen-Geiger climate classification.

11. The method as claimed in claim 3, further comprising measuring outdoor relative humidity,
wherein the calculating of the comfortable temperature further includes adding a value obtained by multiplying the outdoor relative humidity by a predetermined humidity coefficient, and
wherein the humidity coefficient is set to correspond to each of the plurality of climatic models.

12. The method as claimed in claim 1, wherein the acquiring of the position information comprises using a global positioning system (GPS) sensor of the air conditioner.

13. The method as claimed in claim 1, wherein the acquiring of the position information comprises inputting the position information through an interface of the air conditioner.

14. The method as claimed in claim 1, wherein the controlling of the cooling or the heating of the air conditioner comprises:
determining whether or not the indoor temperature is matched to the indoor target temperature; and
when the indoor temperature is not matched to the indoor target temperature, controlling a cooling or heating operation so that the indoor temperature reaches the indoor target temperature.

15. The method as claimed in claim 1, wherein the calculating of the index weight outdoor average temperature comprises obtaining the index weight outdoor average temperature by adding a value obtained by multiplying an outdoor average temperature of the previous day of a calculation day of the outdoor average temperature by a first weight index to a value obtained by multiplying an index weight outdoor average temperature of the previous day by a second weight index greater than the first weight index.

* * * * *